March 23, 1926. 1,577,958
H. W. DAVIS
CAMERA AND FILM KIT
Filed Sept. 28, 1922 3 Sheets-Sheet 2

INVENTOR
HORACE W. DAVIS
BY
Philip S. Hopkins
ATTORNEY

March 23, 1926.  1,577,958

H. W. DAVIS

CAMERA AND FILM KIT

Filed Sept. 28, 1922    3 Sheets-Sheet 3

INVENTOR
HORACE W. DAVIS
BY
ATTORNEY

Patented Mar. 23, 1926.

1,577,958

UNITED STATES PATENT OFFICE.

HORACE W. DAVIS, OF CEDARHURST, NEW YORK, ASSIGNOR, BY MESNE ASSIGNMENTS, TO ANSCO PHOTOPRODUCTS, INC., OF NEW YORK, N. Y., A CORPORATION OF NEW YORK.

CAMERA AND FILM KIT.

Application filed September 28, 1922. Serial No. 591,140.

*To all whom it may concern:*

Be it known that I, HORACE W. DAVIS, a citizen of the United States, and a resident in Cedarhurst, county of Nassau, and State of New York, have invented a new and useful Improvement in Camera and Film Kits, of which the following is a description, reference being had to the accompanying drawings in which like reference numerals indicate like parts.

The principal object of my invention is to provide a camera and film kit in the form of a small portable box or receptacle having compartments therein, and a camera and a plurality of films ready for use, fitting snugly within said compartments. This arrangement furnishes a neat, compact means for carrying a camera and films therefor at all times ready for picture taking, as well as providing a very efficient storage box for the same when not in active use.

A further object is to construct such a receptacle in a manner to provide a very attractive display article for store windows, counters or the like.

Another object is to provide a receptacle for a camera and films which, when not in use, affords a safe, convenient and dirt proof storage container for the same, thereby lessening the wear on the camera usually incident to storing same in drawers or hanging in closets.

It is also an object of this invention to make the camera and film kit an attractive article of furniture by constructing the same of highly polished mahogany wood. This permits the kit to be placed anywhere in the home in plain view, thereby inciting and encouraging the desire to take pictures.

It is notorious that a camera without films is useless and that films without a camera are likewise useless. My invention, therefore, provides a means whereby these two co-operating elements may at all times be co-ordinated and kept for instant use. It very often happens that a person is placed in a position where it is most desirable to use his or her camera in a hurry, but finds no film immediately available. This causes annoyance and delay, and frequently a valuable picture is lost thereby. My invention is designed in a measure to prevent such occurrences by providing a kit wherein the camera may be kept ready for use and with it a supply of films, thereby insuring prompt action when the necessity arises.

Other objects and advantages in details of construction and operation will be apparent as the description proceeds, reference being had to the accompanying drawings wherein like reference numerals indicate like parts.

Figure 1:
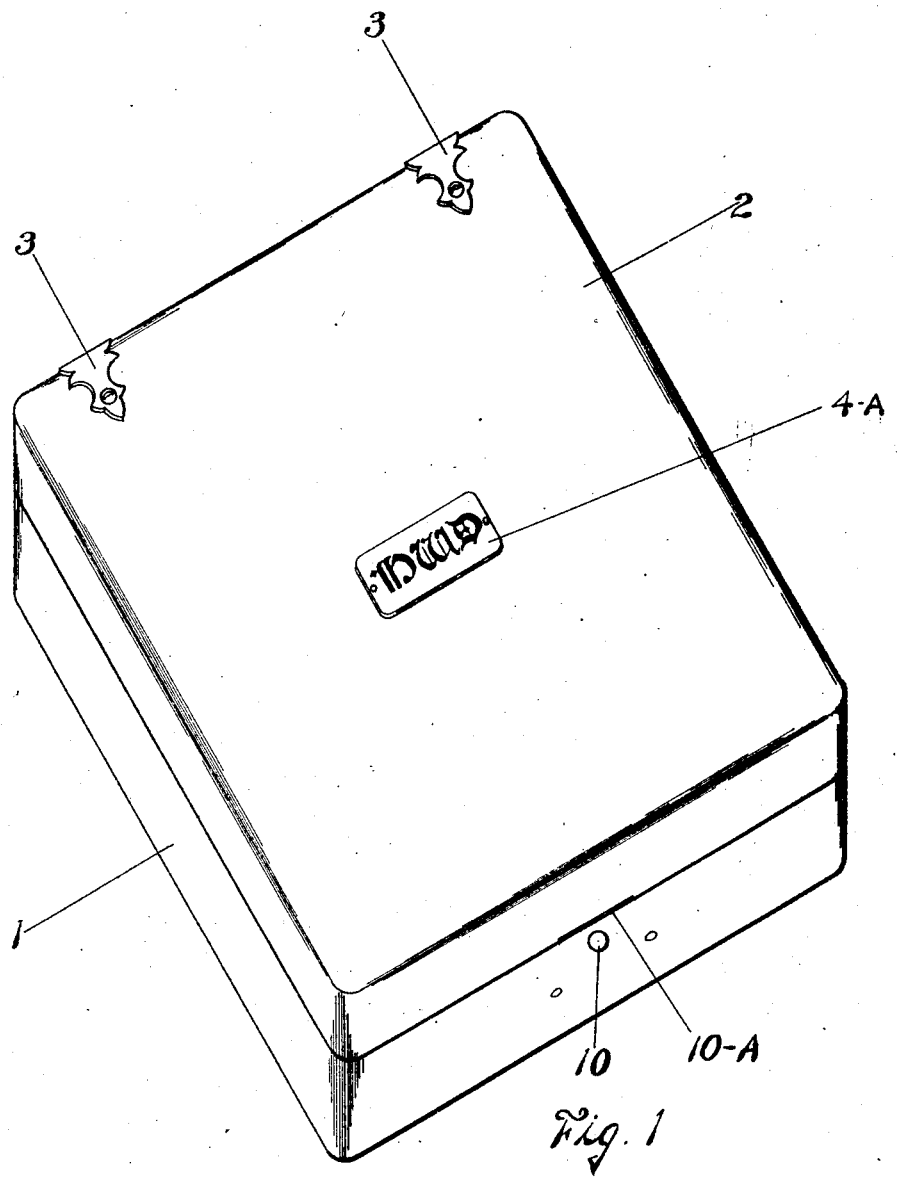
Figure 1 is a perspective view of the camera and film kit in its closed position.

The receptacle is indicated generally by the reference numeral 1 and comprises a rectangular box provided with a cover 2 hinged to the box as at 3—3. The hinges 3—3 are of an ornamental type and add to the attractiveness of the receptacle. Within the hollow on the cover 2 may be placed a name plate 4 upon which any suitable matter may be inscribed such as some advertising feature of the manufacturer. On the outside of cover 2, a second plate 4$^A$ is secured upon which may be engraved the initials of the owner.

The receptacle 1 is divided into compartments including a camera compartment 5, and four smaller film compartments designated by the numerals 6, 7, 8 and 9. The arrangement of these compartments is clearly illustrated in Figures 2 and 3; the camera compartment 5 being as shown at one side of the receptacle and running entirely across the same, while the film compartments lie adjacent thereto. As shown in Figure 3, the compartments are of such size and construction as will permit the films and camera to be held snugly therein whereby shaking or rattling of the same in their respective positions is avoided.

A snap fastener of any suitable nature indicated at 10 is secured to the receptacle 1, with which co-operates a fastening lug 10$^A$ secured to the cover 2, whereby when the cover is in its closed position the kit will be securely fastened. When closed and fastened as shown in Figure 1, the kit is impervious to dust or other particles of dirt, thereby forming adequate protection to the camera and films which necessarily lengthens the life of the same and also keeps the camera clean and ready for use at all times.

Figure 2:
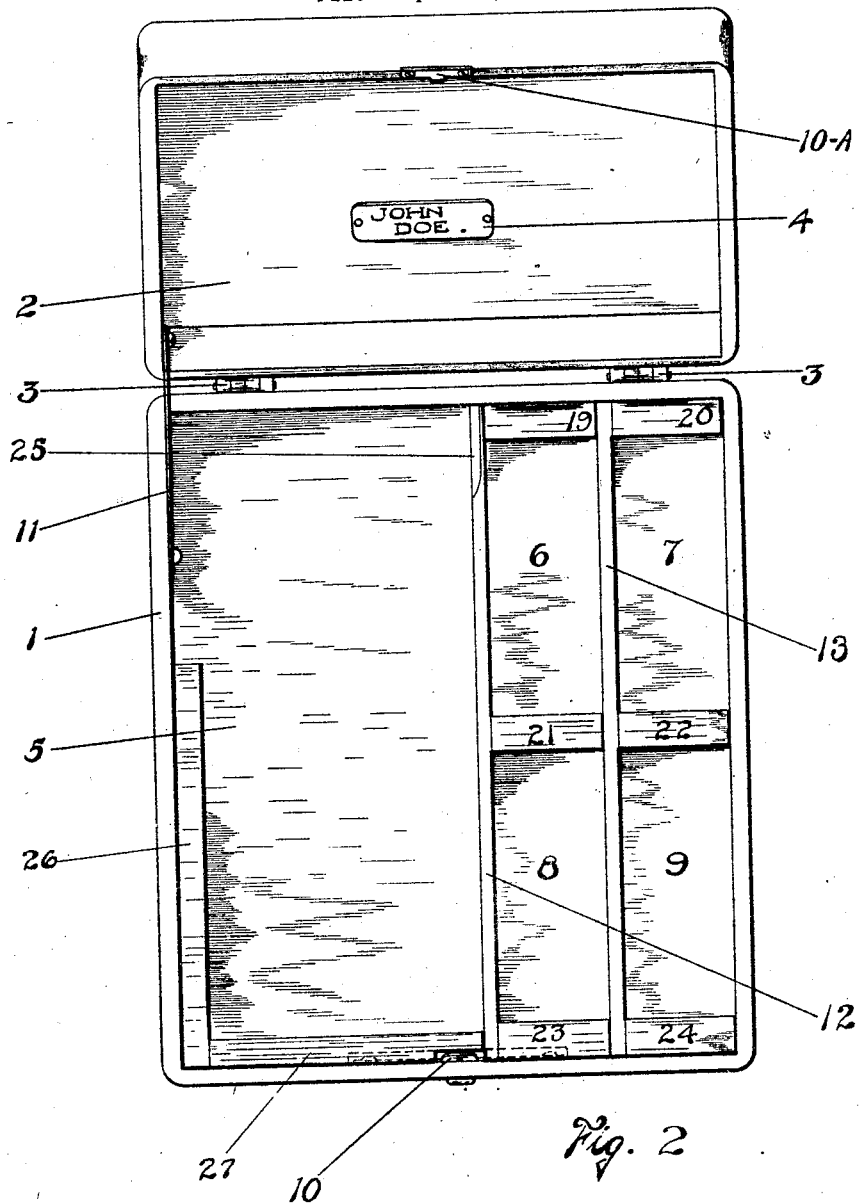
Figure 2 is a top plan view of the kit in its open position, showing clearly the arrangement of the camera and film compartments therein.
Figure 3:
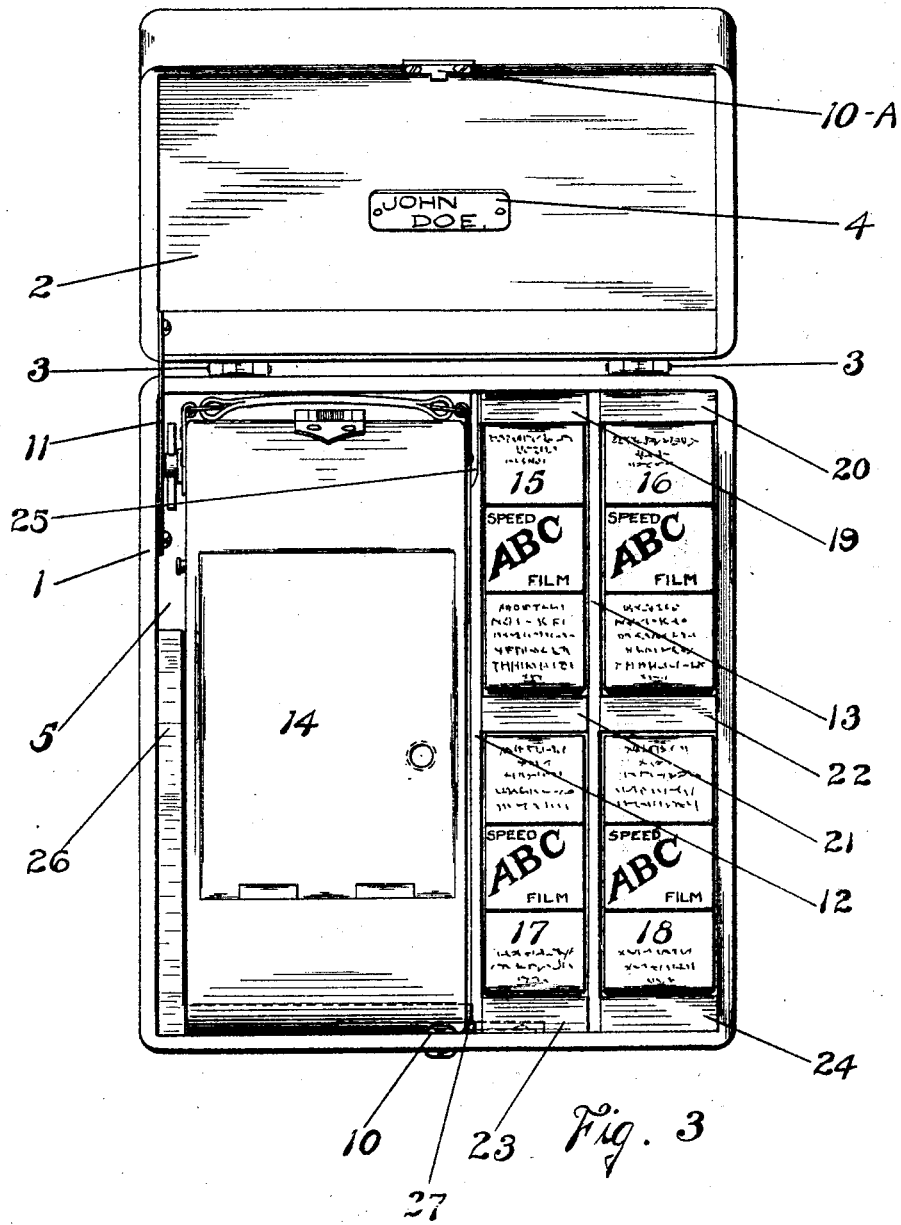
Figure 3 is also a top plan view, similar to Figure 2, but showing the camera and films in position therein.

Secured to the receptacle 1 and cover 2, in a position shown clearly in Figures 2 and 3, is a small bracket 11. This provides a means whereby the cover 2 is held in open position at an angle to the box. This is a feature which contributes to the attractiveness of the kit as a display article, as well as preventing the cover 2 when opened, from falling backward its full distance.

The compartments 5, 6, 7, 8 and 9 are formed in the following manner. A partition 12 divides the receptacle 1 lengthwise, substantially centrally thereof. Half way between the partition 12 and the side of the receptacle is another partition 13 parallel thereto. Blocks 19, 20, 21, 22, 23 and 24 are inserted between the partitions 12 and 13 and secured thereto in any suitable manner, thus forming the compartments 6, 7, 8 and 9 as shown clearly in Figures 2 and 3. The partitions 12 and 13, and the blocks 19, 20, 21, 22, 23 and 24 may be assembled independent of the receptacle 1 and then placed therein as a unit and secured in any suitable manner.

One end of the partition 12 is beveled along its upper edge, thus providing ample space for the handle securing means on the camera as clearly shown in Figure 3. A block or pad 26 is placed in the camera compartment 5 in the position shown in Figures 2 and 3, and a second block or pad 27 is secured in this compartment at the lower end thereof. These members provide means whereby the camera is tightly held in its compartment thus preventing shaking or jarring of the camera. As shown in Figures 2 and 3, the blocks 27 and 23 are recessed to provide space for the fastening element 10.

Figure 3 shows the kit complete and charged with a camera indicated at 14 lying in the compartment 5, and with films designated 15, 16, 17 and 18 in their respective compartments. For display purposes as in show windows, or counter displays, the cover 2 is raised, the camera 14 opened and set up vertically in the compartment 5, and the films raised at one end, whereby the complete kit is shown to its best advantage.

It will be seen from the foregoing description that in my invention I have provided an article long sought by camera users, that is, a compact kit of attractive form which combines the two interdependent articles, camera and film. This combination of parts I believe to be novel and of great utility to the great mass of camera users as well as a practical and commercially profitable article to the manufacturer. Of course, the exact form shown and described above has to be taken as illustrative only for obviously the device is susceptible to many changes in details of construction and function without departing from the scope of the invention. I do not, therefore, limit myself to the form shown other than by the appended claim.

I claim:

In an article of manufacture, a receptacle of the character described, a partition in said receptacle forming a camera compartment therein provided with spacing blocks; the upper edge of said partition being partially beveled, a second partition parallel to said first mentioned partition, blocks between said partitions forming film compartments, and a hinged cover for said receptacle.

HORACE W. DAVIS.